United States Patent
Natal et al.

(10) Patent No.: US 10,071,812 B2
(45) Date of Patent: Sep. 11, 2018

(54) DEVICE FOR SUSPENDING A CASING, A TURBINE ENGINE AND A PROPULSION ASSEMBLY

(71) Applicant: SAFRAN AIRCRAFT ENGINES, Paris (FR)

(72) Inventors: Maria Natal, Moissy Cramayel (FR); Arnaud Ple, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 679 days.

(21) Appl. No.: 14/489,649

(22) Filed: Sep. 18, 2014

(65) Prior Publication Data
US 2015/0075177 A1   Mar. 19, 2015

(30) Foreign Application Priority Data
Sep. 18, 2013   (FR) ...................................... 13 58981

(51) Int. Cl.
*B64D 27/26*   (2006.01)
*F16M 1/04*   (2006.01)
(Continued)

(52) U.S. Cl.
CPC ........... *B64D 27/26* (2013.01); *F01D 25/285* (2013.01); *F16M 1/04* (2013.01); *B64D 27/16* (2013.01);
(Continued)

(58) Field of Classification Search
CPC .............. B64D 27/26; B64D 2027/262; B64D 2027/264; B64D 2027/266; F01D 25/28
See application file for complete search history.

(56) References Cited

U.S. PATENT DOCUMENTS

| | | | | | |
|---|---|---|---|---|---|
| 3,155,352 A | * | 11/1964 | Batt | ........................... | F02C 7/32 248/662 |
| 3,543,588 A | * | 12/1970 | Richardson | ............... | F02C 7/32 60/798 |

(Continued)

FOREIGN PATENT DOCUMENTS

| EP | 1 008 738 A2 | 6/2000 |
|---|---|---|
| EP | 2 082 961 A1 | 7/2009 |

(Continued)

OTHER PUBLICATIONS

French Preliminary Search Report and Written Opinion dated Jun. 20, 2014 in Patent Application No. 1358981 (with English translation of categories of cited documents).

*Primary Examiner* — William H Rodriguez
*Assistant Examiner* — Stephanie Cheng
(74) *Attorney, Agent, or Firm* — Oblon, McClelland, Maier & Neustadt, L.L.P.

(57) ABSTRACT

A device for suspending a casing of a turbine engine to the structure of an aircraft is provided. The device includes a suspension ring including a plurality of attachment surfaces positioned so as to protrude on the circumference of the suspension ring and having attachment holes for attachment to the structure; a circumferential flange including a plurality of holes for attaching the suspension ring to the casing; and one or several hanging surfaces for hanging at least one piece of equipment, positioned so as to protrude on the circumference of the suspension ring, and having holes for hanging the piece of equipment to the ring.

11 Claims, 11 Drawing Sheets

(51) Int. Cl.
  *F01D 25/28*   (2006.01)
  *B64D 27/16*   (2006.01)
(52) U.S. Cl.
  CPC .. *B64D 2027/262* (2013.01); *B64D 2027/264* (2013.01); *B64D 2027/266* (2013.01); *Y02T 50/671* (2013.01)

(56) References Cited

U.S. PATENT DOCUMENTS

| | | | | |
|---|---|---|---|---|
| 3,688,505 | A * | 9/1972 | Dison | F02C 7/36 60/226.1 |
| 4,044,973 | A * | 8/1977 | Moorehead | B64D 27/20 244/54 |
| 6,401,448 | B1 * | 6/2002 | Manteiga | B64D 27/26 244/54 |
| 6,843,449 | B1 * | 1/2005 | Manteiga | B64D 27/26 244/54 |
| 8,313,293 | B2 * | 11/2012 | Heyerman | B64D 27/26 248/554 |
| 2006/0032974 | A1 | 2/2006 | Williams | |
| 2006/0248900 | A1 | 11/2006 | Suciu et al. | |
| 2010/0040466 | A1 | 2/2010 | Vauchel et al. | |
| 2011/0168837 | A1 * | 7/2011 | Balk | B64D 27/26 244/54 |
| 2011/0296847 | A1 * | 12/2011 | Williams | B21D 53/50 60/796 |
| 2012/0175462 | A1 * | 7/2012 | Journade | B64D 27/18 244/54 |
| 2012/0198815 | A1 * | 8/2012 | Suciu | F02K 3/075 60/226.3 |
| 2012/0198817 | A1 * | 8/2012 | Suciu | B64D 27/26 60/226.3 |
| 2012/0224950 | A1 | 9/2012 | Fert | |
| 2012/0304811 | A1 * | 12/2012 | Niggemeier | F02C 7/32 74/606 R |
| 2013/0202430 | A1 | 8/2013 | Gaudry et al. | |
| 2014/0061426 | A1 * | 3/2014 | Zheng | B64D 27/26 248/554 |
| 2014/0174056 | A1 * | 6/2014 | Suciu | B64D 27/26 60/226.1 |
| 2014/0217234 | A1 * | 8/2014 | Dezeustre | B64D 27/26 244/54 |
| 2015/0047370 | A1 * | 2/2015 | Beaujard | F01D 25/28 60/797 |
| 2015/0069176 | A1 * | 3/2015 | Stretton | B64D 27/26 244/54 |
| 2015/0375867 | A1 * | 12/2015 | Zheng | B64D 27/26 415/213.1 |
| 2017/0002674 | A1 * | 1/2017 | Vetters | F01D 25/246 |

FOREIGN PATENT DOCUMENTS

FR         2 952 672 A1    5/2011
WO    WO 2008/043903 A2   4/2008

* cited by examiner

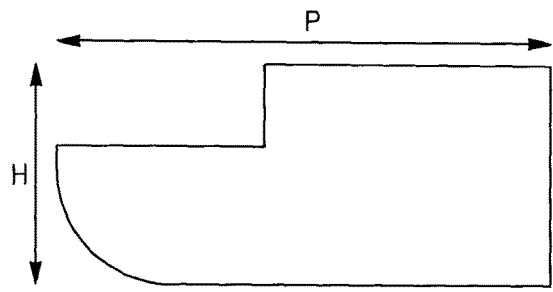
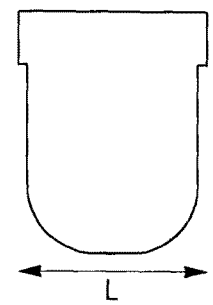
FIG. 15A          FIG. 15B
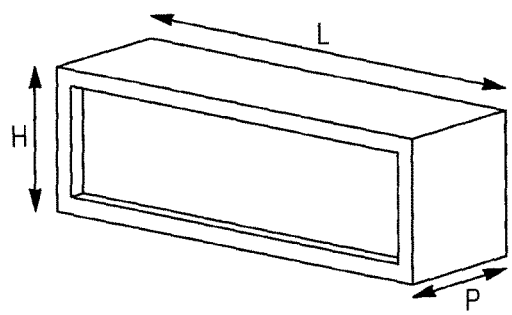
FIG. 16
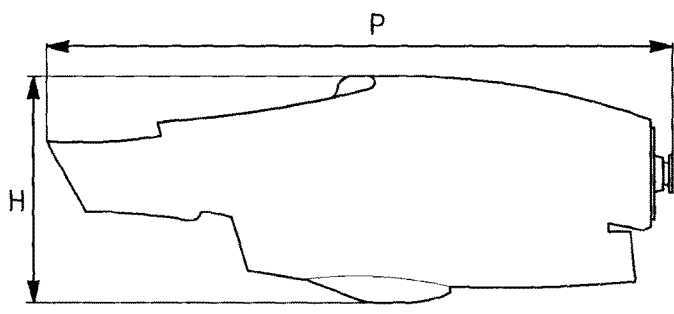
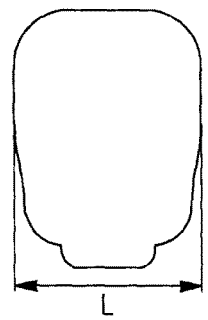
FIG. 17A          FIG. 17B

DEVICE FOR SUSPENDING A CASING, A TURBINE ENGINE AND A PROPULSION ASSEMBLY

FIELD OF THE INVENTION

The invention relates to a device for suspending a casing of a turbine engine to the structure of an aircraft. The invention also relates to a turbine engine and to a propulsion assembly comprising such a device.

PRESENTATION OF THE PRIOR ART

A propulsion assembly comprises a turbine engine, as well as a plurality of systems.

These systems conventionally comprise pieces of equipment to be hung up, such as for example exchangers or hydraulic components.

Now, this hanging proves to be a problem when there exists difficulties for accessing the flanges of the turbine engine.

The flanges of the turbine engine are 360° ferrules used for assembling the different casings of the turbine engine. These flanges form a robust attachment surface for the pieces of equipment.

In the case of suspending the turbine engine at the inter-turbine casing, it is imperative to set into place a suspension ring 100 surrounding the casing (cf. FIG. 1), in order to distribute the forces over 360° and thereby avoid deformations of the casing.

This inter-turbine casing is conventionally located downstream from the turbine engine, in proximity to the exhaust casing, between two turbines, in particular between the high pressure turbine and the low pressure turbine.

In the particular case of the surface of the inter-turbine casing, access to the flanges may prove to be difficult because of the presence of the suspension ring 100.

As schematized in FIG. 1, the suspension ring 100 is attached onto the circumference of a flange 101 of the casing.

This attachment has the consequence that the flanges of the casing have reduced accessibility which reduces the number of possible surfaces for hanging the pieces of equipment.

In order to solve the problem of the congestion caused by the attachment of the ring 4 on the casing 2, the prior art solutions require the use of additional supports, added onto the casing 2, like the support 102 illustrated in FIG. 1.

Now, these supports are complex to design and to install.

Further, the presence of additional supports for hanging the pieces of equipment increases the mass of the turbine engine.

PRESENTATION OF THE INVENTION

In order to overcome the drawbacks of the prior art, the invention proposes a device for suspending a turbine engine casing from the structure of an aircraft, characterized in that it comprises a suspension ring, said suspension ring comprising:
  a plurality of attachment surfaces, positioned so as to protrude on the circumference of the suspension ring and having attachment holes for attachment to the structure,
  a circumferential flange comprising a plurality of holes for attaching the suspension ring to the casing;
  one or several hanging surfaces for hanging at least one piece of equipment, positioned so as to protrude on the circumference of the suspension ring, and having holes for hanging the piece of equipment to the ring.

The invention is advantageously completed by the following features, taken alone or in any of their technically possible combination:
  the hanging surfaces are protruding lugs on the circumference of the ring;
  the hanging surfaces are positioned facing each other on the upstream circumference of the ring and on the downstream circumference of the ring;
  one of the hanging surfaces comprises at least two suspension holes for hanging a piece of equipment (case of a "fail-safe" or redundant system);
  the attachment surfaces are positioned at an azimuth angle comprised between 9 o'clock and 3 o'clock (upper portion of the ring);
  the suspension ring comprises attachment surfaces both on a upstream circumference of the ring (i.e. along a perimeter of the ring positioned on the upstream side of the latter) and on a downstream circumference (i.e. along a perimeter of the ring positioned on the downstream side of the latter), positioned facing each other;
  the upstream circumference and the downstream circumference of the ring are separated by a circumferential groove;
  the upstream and downstream hanging surfaces are positioned facing each other, and define a space between said surfaces able to receive the end of a connecting rod;
  the hanging surfaces are positioned on the circumference of the ring at an azimuth angle comprised between 3 o'clock and 9 o'clock;
  the hanging surfaces are positioned on the side opposite to the attachment surfaces.

The invention also relates to a turbine engine comprising at least one casing, comprising at least one flange, one suspension ring, surrounding the casing and attached to the flange of the casing (or to the flanges of adjacent casings), said suspension ring comprising a plurality of attachment surfaces, positioned so as to protrude on the circumference of the suspension ring and having attachment holes, for attachment to a structure of an aircraft, one or several hanging surfaces for at least one piece of equipment positioned so as to protrude on the circumference of the suspension ring, and having holes for hanging a piece of equipment to the suspension ring.

The invention also relates to a propulsion assembly comprising a turbine engine as described earlier, and at least one piece of equipment hung to the suspension ring via a connecting rod attached on a piece of equipment and on at least one hole of a hanging surface.

The propulsion assembly is advantageously completed by the following features, taken alone or in any of their technically possible combination:
  one of the hanging surfaces comprises at least two holes, the propulsion assembly comprising a piece of equipment hung to the suspension ring via a connecting rod attached onto the piece of equipment and on both holes of the hanging surface, so as to ensure redundancy;
  the casing comprises a flange adjacent to a flange of another casing of the turbine engine, both flanges comprising a plurality of holes, the suspension ring comprises a circumferential flange comprising a plurality of holes, positioned adjacent to both flanges themselves adjacent to each other, the flange of the ring being attached to the flanges of the casings via attachment tools passing through the holes of the flanges of the casings and of the circumference of the flanges of the suspension ring;

the suspension ring comprises a circumferential flange comprising a plurality of holes, positioned between the flanges of adjacent casings, the flanges of the casings comprising a plurality of holes, the flange of the ring being attached to the flanges of the casings, via attachment tools passing through the holes of the flanges of the casings and of the circumferential flange of the suspension ring;

the propulsion assembly further comprises a connecting rod for load spreading attached to the piece of equipment hung to the suspension ring, and to the casing;

the connecting rods have an end attached to the structure and the other end received between the upstream and downstream attachment surfaces of the ring.

The invention thus provides a simple and efficient solution for hooking up the pieces of equipment on the turbine engine.

No additional part is required. The mass of the assembly is therefore reduced. Further, the hooking-up surfaces are immediately accessible.

PRESENTATION OF THE FIGURES

Other features and advantages of the invention will further become apparent from the description which follows, which is purely illustrative and non-limiting, and should be read with reference to the appended drawings wherein:

FIGS. 15A and 15B are a schematic illustration of the dimensions of a small size nacelle (side and front views);

FIG. 16 is a schematic illustration of dimensions of a piece of equipment of the propulsion assembly which comprises the nacelle of FIGS. 15A and 15B;

FIGS. 17A and 17B are a schematic illustration of dimensions of a large size nacelle (side and front views);

DETAILED DESCRIPTION

Figure 1:
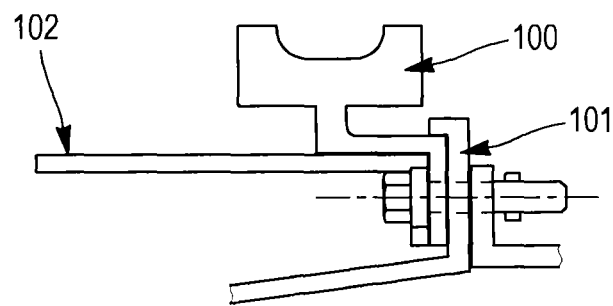
FIG. 1 is an illustration of a solution of a prior art.
Figure 2:
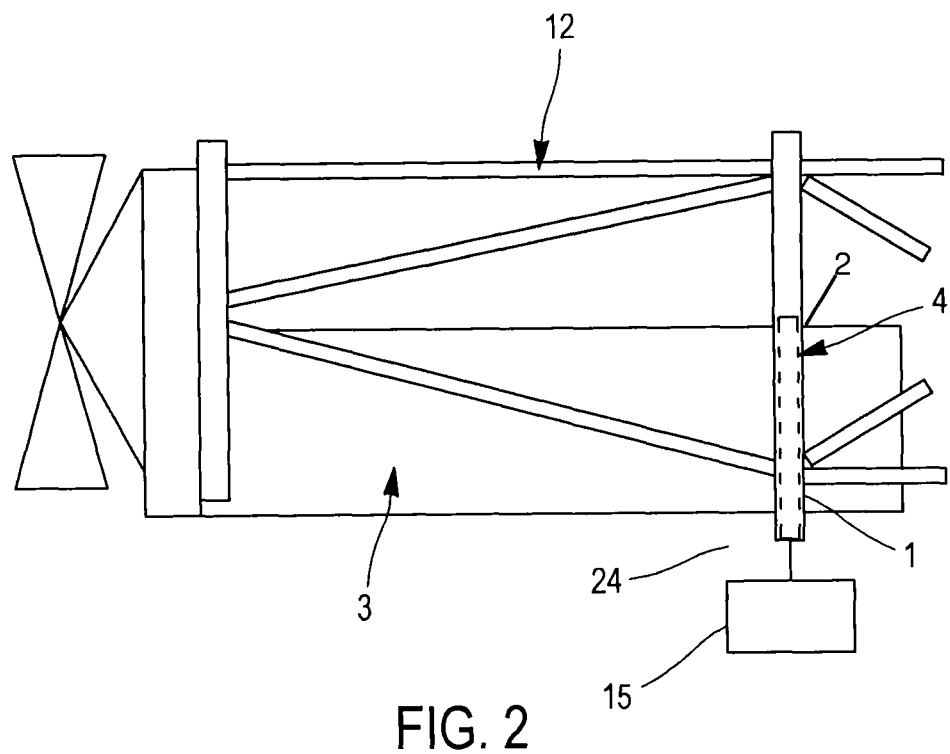
FIG. 2 is a schematic illustration of an embodiment of a propulsion assembly of an aircraft, comprising a suspension device with a ring according to the invention.
Figure 3:
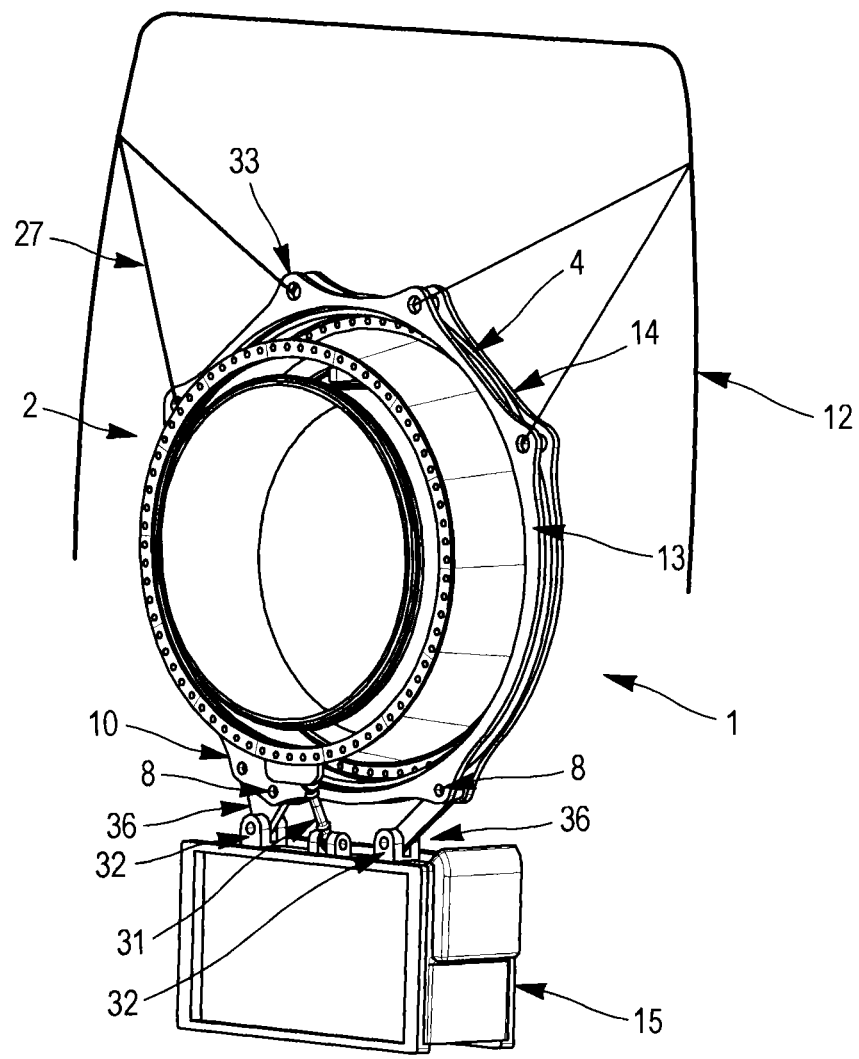
FIG. 3 is a schematic illustration of an example of use of a suspension ring onto which is attached a piece of equipment.

A device 1 for suspending a turbine engine 3 from the structure 12 of an aircraft as well as the setting of the place of this device 1 around a casing 2 is illustrated in FIGS. 2 and 3.

Figure 13:
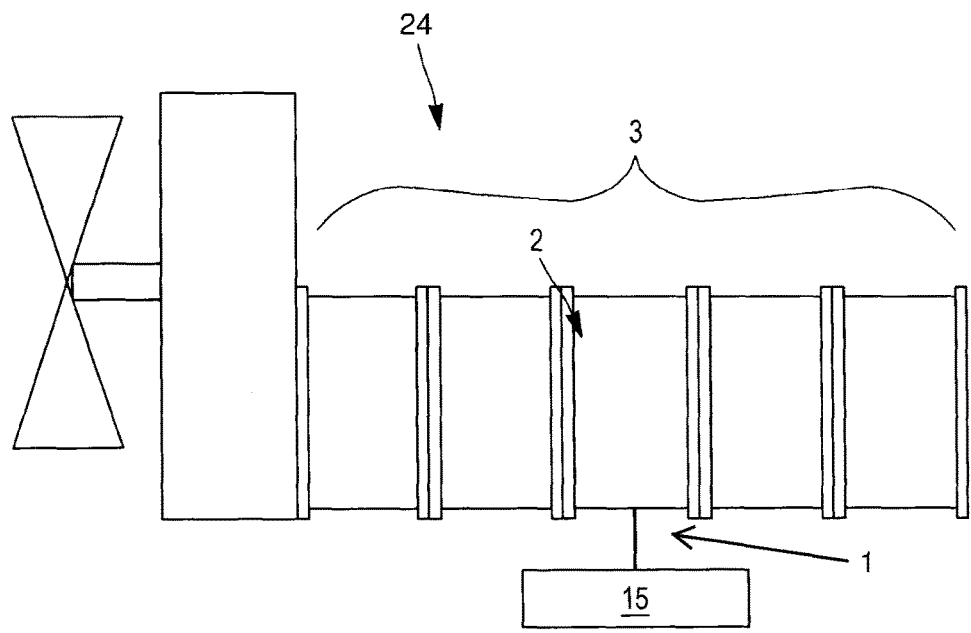
FIG. 13 is a schematic illustration of a propulsion assembly.

A propulsion assembly 24 comprising the turbine engine 3, the device 1 for suspending a turbine engine from the structure 12, and a piece of equipment 15 hung to the device 1 is illustrated in FIG. 13.

The structure 12 from which the turbine engine is suspended is commonly called the cradle of the aircraft. The cradle conventionally comprises frames connected through connected rods.

The casing 2 on which the device 1 is set into place is for example a casing positioned downstream following the turbine engine 3, called the inter-turbine casing. This is a casing positioned between two turbines, in particular between the high pressure turbine and the low pressure turbine.

Figure 14:
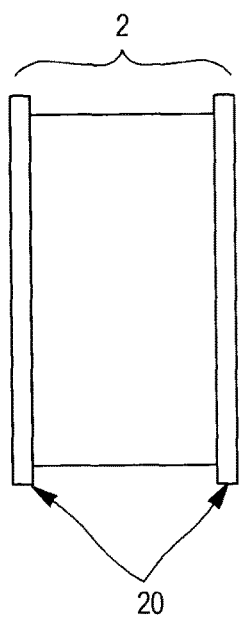
FIG. 14 is a schematic illustration of a casing.

The casing 2 is conventionally an axisymmetrical part, the outer cover of which is ring-shaped. The center of the casing 2 consists of an aperture. The outer cover of the casing 2 ends with at least one attachment flange 20 (cf. FIG. 14).

This is a circumferential flange 20 extending over the external perimeter of the casing 2. This flange 20 is attached to another flange 29 of the same type belonging to another adjacent casing 25 of the turbine engine 3.

The turbine engine 3 comprises a succession of adjacent casings attached to each other (FIG. 13).

As explained subsequently, the flanges 20, 29 may be adjacent, or receive between them a flange of the suspension device 1.

The flanges 20, 29 of the casings 2, 25 each comprise a plurality of holes 30 facing them allowing attachment tools to be passed through them.

As illustrated in FIG. 3, the device 1 comprises a suspension ring 4.

Figure 4:
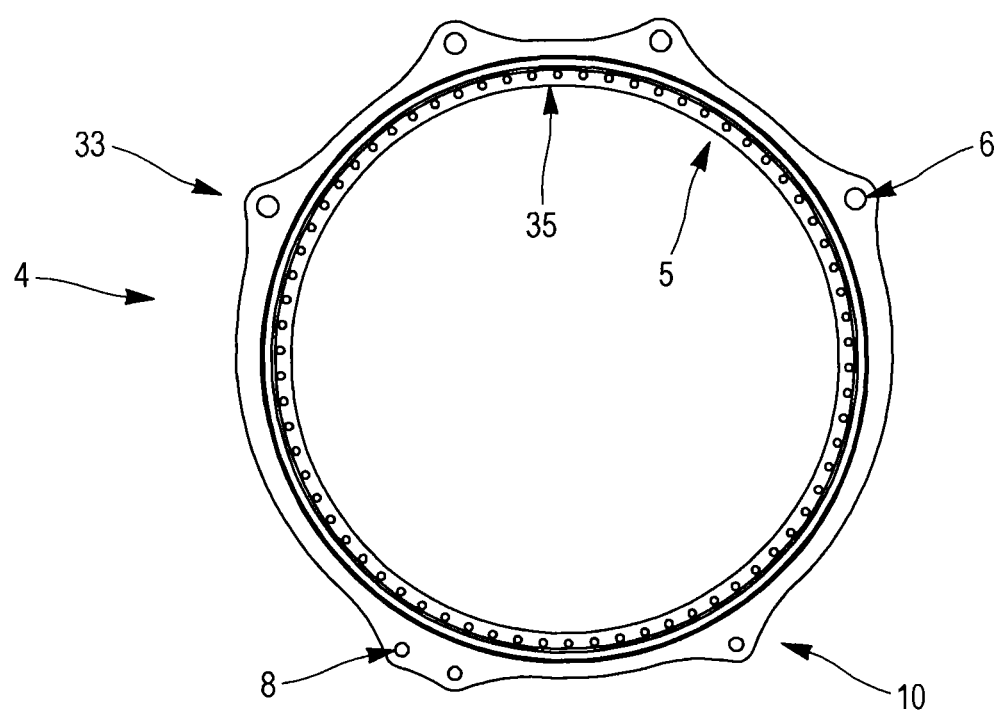
FIG. 4 is a schematic illustration of an embodiment of a suspension ring in a front view.

The ring 4 comprises a wide aperture in its center giving the possibility of surrounding the casing or the casings onto which the ring 4 is attached (FIG. 4).

The suspension ring 4 comprises a circumferential flange 5 which extends towards the inside of the ring 4 and covers at least one portion of the internal circumference of the ring 4. The flange 5 is therefore at least partly ring-shaped.

The circumferential flange 5 comprises a plurality of holes 35 for attaching the ring 4 to at least one casing of the turbine engine.

In order to ensure the attachment of the ring 4 to the structure 12 of the aircraft, the suspension ring 4 comprises a plurality of attachment surfaces 33, positioned so as to protrude on the circumference of the ring 4.

The attachment surfaces 33 are for examples protruding lugs, each comprising at least one attachment hole 6 (cf. FIG. 4). They may also assume the shape of yokes or extensions of any protruding shape on the circumference of the ring 4.

Alternatively, the attachment surfaces 33 may belong to a continuous perimeter. However, distinct surfaces 33 are preferable in order to reduce the mass.

They are conventionally positioned at an azimuth angle comprised between 9 o'clock and 3 o'clock (upper portion of the ring 4).

Generally, the suspension ring 4 comprises attachment surfaces 33 both on a upstream circumference 13 of the ring 4 (i.e. along a perimeter of the ring 4 positioned on the upstream side of the latter) and on downstream circumference 14 (i.e. along a perimeter of the ring 4 positioned on the downstream side of the latter), positioned facing each other. According to a possible embodiment of the ring 4, the upstream circumference 13 and the downstream circumference 14 of the ring 4 are separated by a circumferential groove 23 (cf. FIG. 5).

The suspension of the ring 4 from the structure 12 of the aircraft may be implemented via connecting rods 27 (cf. FIG. 3), one end of which is attached to the structure 12 and the other end is received between the upstream and downstream attachment surfaces 33 of the ring 4. Screws crossing the attachment holes 6 and complementary holes present on the end of the connecting rods 27 give the possibility of ensuring attachment.

The suspension ring 4 further comprises one or several hanging surfaces 10 for at least one piece of equipment 15, positioned so as to protrude on the circumference of the ring 4.

By piece of equipment 15 is meant independent elements of the turbine engine which require being attached onto the latter. These are for example, exchangers or hydraulic components or other components, depending on the cases.

Figure 5:
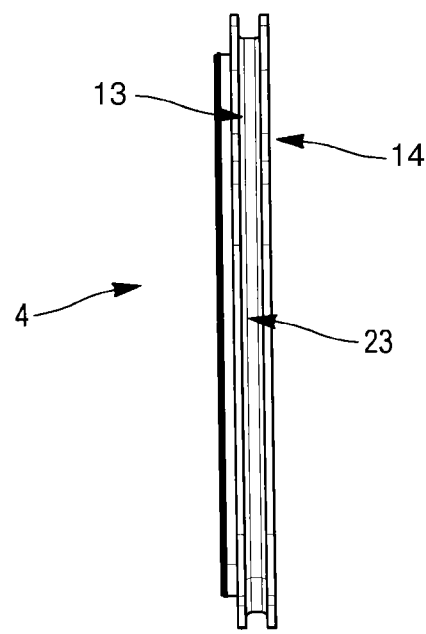
FIG. 5 is a schematic illustration of an embodiment of a suspension ring in a profile view.
Figure 6:
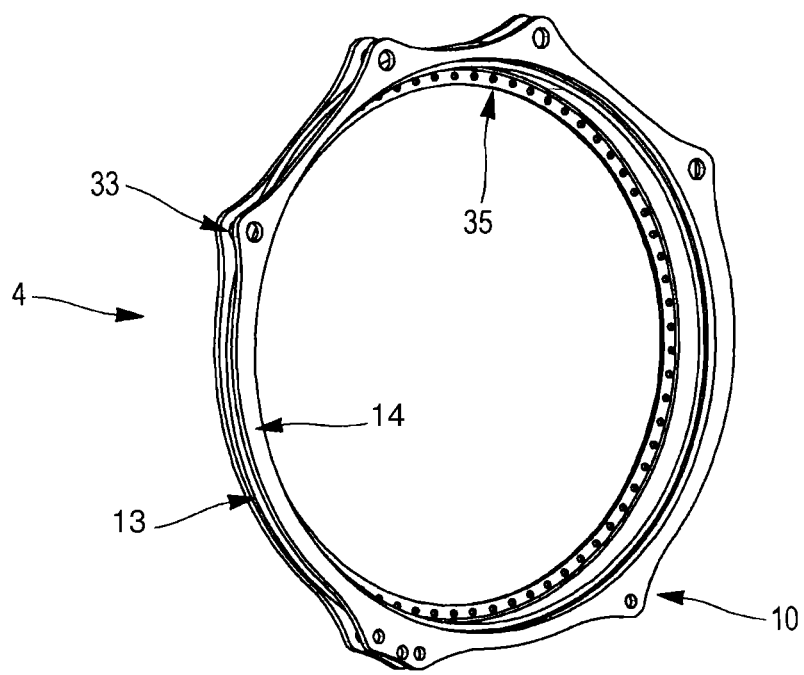
FIG. 6 is a schematic illustration of an embodiment of a suspension ring in a side view.
Figure 7:
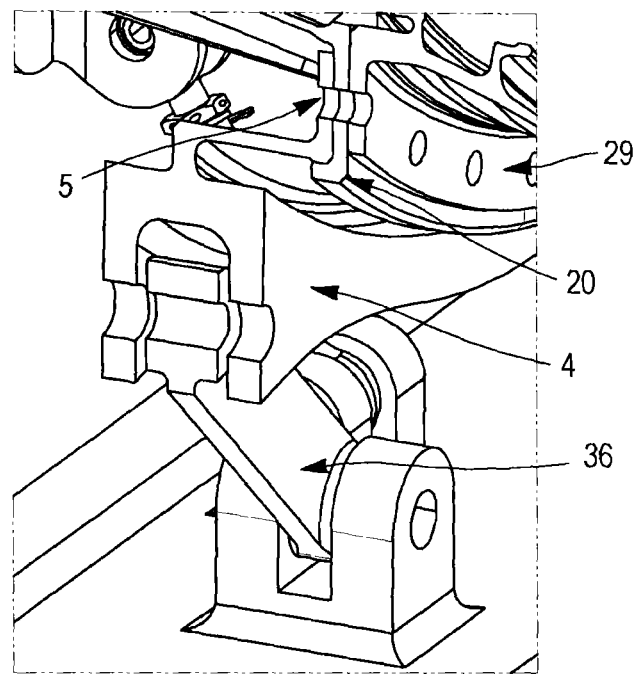
FIG. 7 is a schematic illustration of an embodiment of the attachment of a piece of equipment to the ring, and of the ring to the casings, in a profile view.
Figure 8:
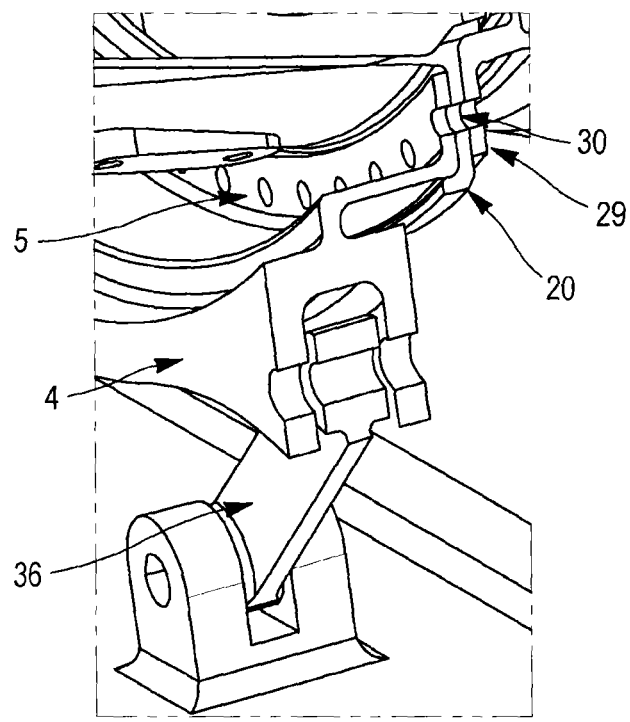
FIG. 8 is a schematic illustration of the embodiment of FIG. 7 in a side view.
Figure 9:
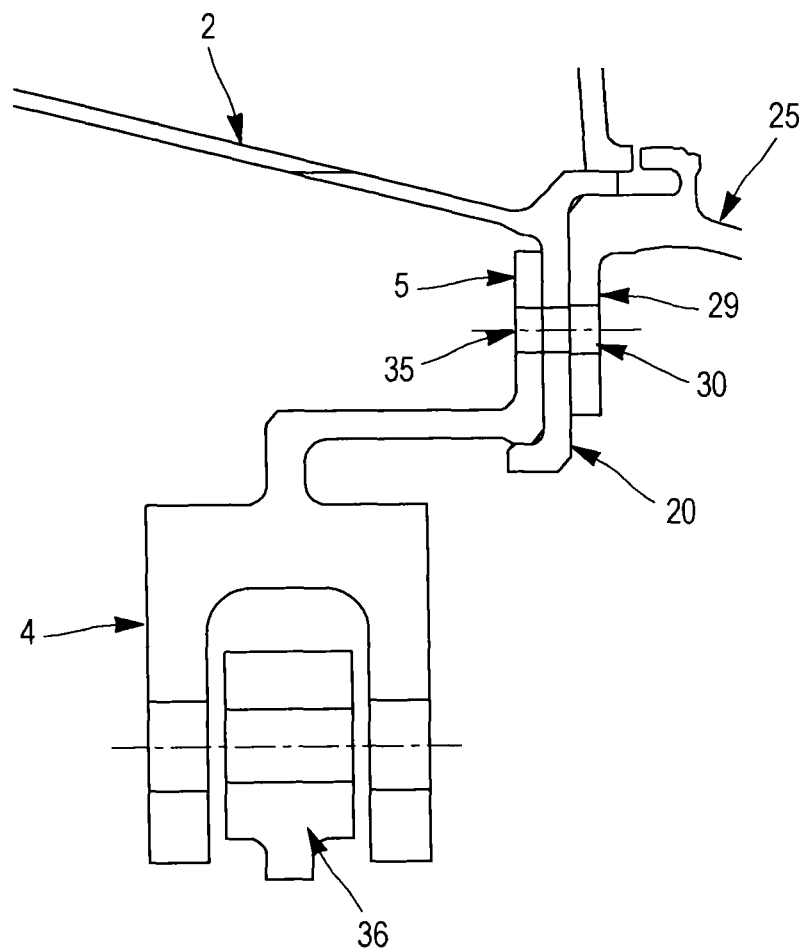
FIG. 9 is a schematic illustration of the embodiments of FIGS. 7 and 8 in a sectional view.

The hanging surfaces 10 have holes 8 for hanging the piece of equipment 15 to the ring 4 (cf FIG. 5).

Thus, by the hanging surfaces 10, the piece of equipment 15 is directly hung onto the ring 4.

In the exemplary embodiment of FIG. 3, the ring 4 extends radially, and the hanging surfaces 10 also extend radially, in parallel or in the plane of the ring 4.

The hanging surfaces 10 are for example protruding lugs on the circumference of the ring 4 or protruding yokes. They may also assume the form of extensions of any protruding shape on the circumference of the ring 4.

It is possible that the hanging surfaces 10 be contiguous, but it is preferable that they be distinct in order to reduce the mass.

Thus, the piece of equipment 15 may be hung to the ring 4 via a connecting rod 36 attached on the piece of equipment 15 and on at least one hole 8 of a hanging surface 10. On the side of the piece of equipment 15, the connecting rod 36 may notably be attached onto yokes 32 of the piece of equipment 15 (cf. FIG. 3).

According to a possible embodiment, the hanging surfaces 10 are positioned on the upstream circumference 13 of the ring and on the downstream circumference 14 of the ring 4. The upstream and downstream hanging surfaces 10 are positioned facing each other and therefore define a space between said surfaces 10 with which the end of the connecting rod 36 may be received.

The attachment is for example ensured via screws (or other attachment tools) passing through the holes 8 of the hanging surfaces 10 facing each other, and via holes present on the corresponding end of the connecting rod 36.

According to the exemplary embodiment illustrated in FIG. 5, the hanging surfaces 10 are positioned on the circumference of the ring 4 at an azimuth angle comprised between 3 o'clock and 9 o'clock, which allows the piece of equipment 15 to be suspended to the ring 4. In this casing, the hanging surfaces 10 are positioned on the side opposite to the attachment surfaces 33.

In order to ensure the redundancy of the hanging, of the "fail safe" type, according to an embodiment, it is provided that one of the hanging surfaces 10 comprises at least two holes 8 for hanging a piece of equipment 15 (see FIG. 4). In this case, the hanging surface 10 on the upstream circumference and the facing hanging surface 10 on the downstream circumference each comprise at least two holes 8 facing each other, as illustrated in the figures.

Thus, by means of these two holes 8 present on a same hanging surface 10, the connecting rod 36 connecting the piece of equipment 15 to the hanging surface 10 is attached to at least two locations which reinforce the safety of the hanging by redundancy.

This is illustrated in FIG. 3, in which the piece of equipment 15 is hanging to the ring 4 via a connecting rod 36 attached onto the piece of equipment 15 and on both holes 8 of the hanging surface 10, in this case on the upstream and downstream hanging surfaces 10 of the ring 4.

According to an embodiment, illustrated in FIG. 3, a load-spreading connecting rod 31 is attached to the piece of equipment 15 hung to the ring 4 on the one hand and to the casing 2 on the other hand. This connecting rod 31 gives the possibility of spreading the loads along the engine axis, in order to avoid swinging of the piece of the equipment 15.

An embodiment of the attachment of the ring 4 to casings of the turbine engine is illustrated in FIGS. 7 to 11.

As illustrated in these figures, the circumferential flange 5 of the ring 4 will be attached against both adjacent flanges 20, 29 of the adjacent casings 2, 25.

Thus, the circumferential flange 5 is adjacent to one of the flanges 20 of a casing 2, this flange 20 of a casing 2 being itself adjacent to the flange 29 of another casing 25.

The attachment of the flange 5 against these flanges 20, 29 is ensured via attachment tools (for example screws) passing through the holes of the flanges 20, 29 of the casings and of the circumferential flange 5 of the ring 1.

Figure 10:
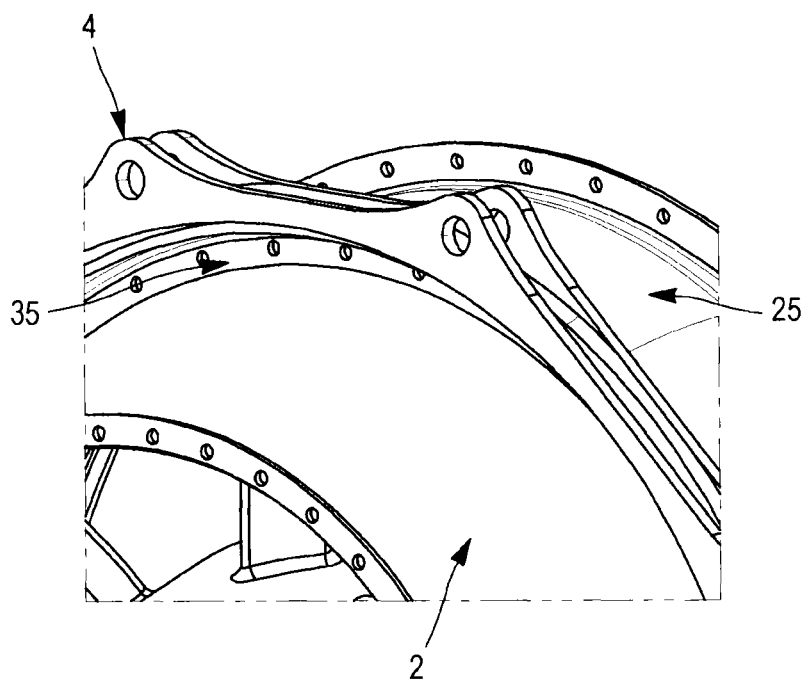
FIGS. 10 and 11 illustrate the attachment of the ring to two adjacent casings.
Figure 11:
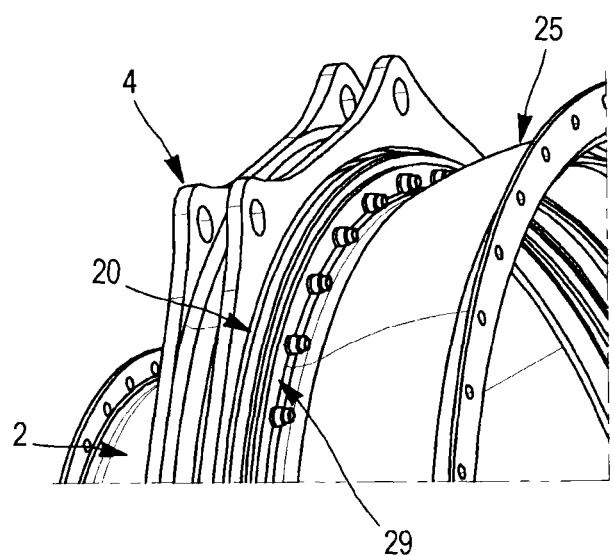

In FIGS. 10 and 11, the ring 4 thus surrounds the casing 2 and is attached to the casing 2 and to the adjacent casing 25 as described earlier.

Figure 12:
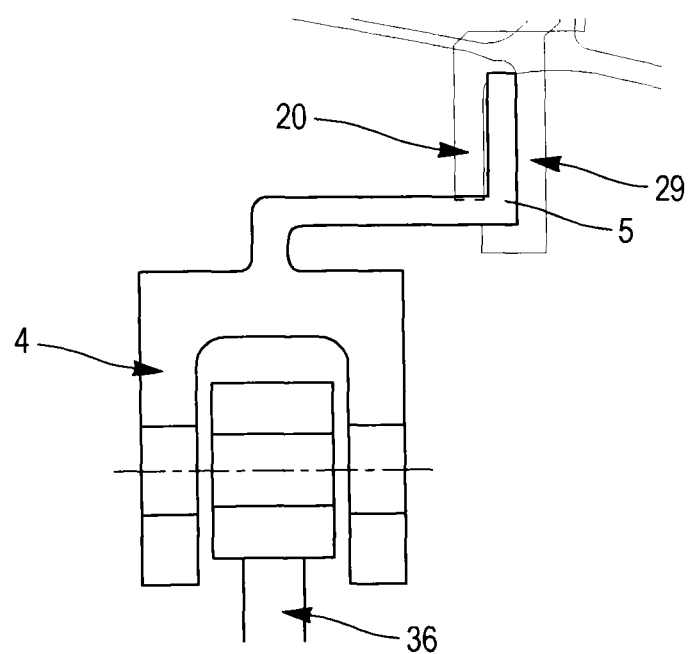
FIG. 12 is a schematic illustration of another embodiment of the attachment of the piece of equipment to the ring, and of the ring to the casings, in a sectional view.

According to another embodiment, illustrated in FIG. 12, the circumferential flange 5 of the ring 4 is positioned between the flange 29 of the casing 2 and the flange 20 of the other adjacent casing 25. The flange 5 is therefore inserted between the flanges 20 and 29.

The attachment of the flange 5 between these flanges 20, 29 is ensured via attachment tools (for example screws) passing through the holes of the flanges 20, 29 of the casings 2, 25 and of the circumferential flange 5 of the ring 1.

The suspension device 1 applies to any type of propulsion assemblies.

In particular it applies to propulsion assemblies comprising small size turbine engines, insofar that this type of turbine engine has more reduced hanging surfaces for pieces of equipment. It is therefore necessary to optimize at best the hanging of the pieces of equipment.

Figure 18:
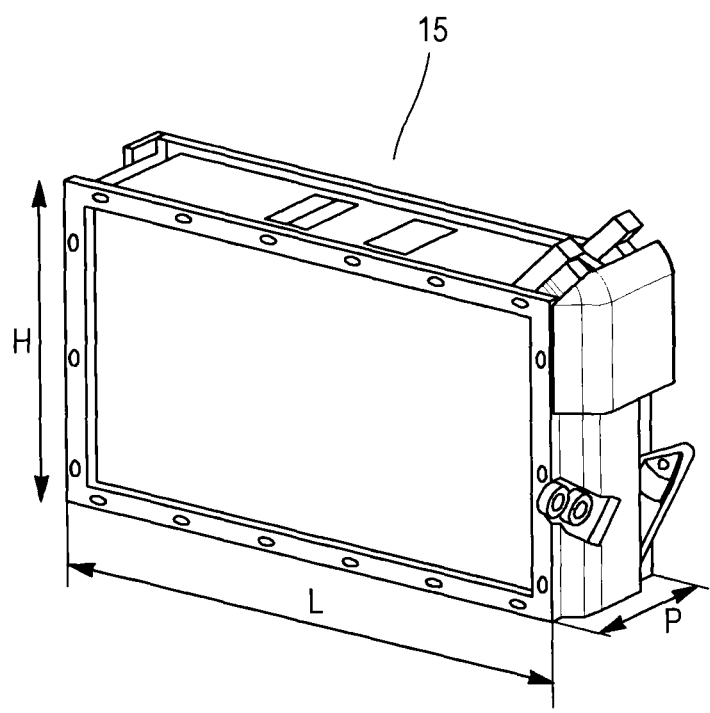
FIG. 18 is a schematic illustration of dimensions of a piece of equipment of the propulsion assembly which comprises the nacelle of FIGS. 17A and 17B.

FIGS. 15 to 18 compare the dimensions of a large size nacelle (FIG. 17) with a small size nacelle (FIG. 15), as well as the respective dimensions of a piece of standard equipment specific to each nacelle (FIGS. 16 and 18). The dimensions (in meters) illustrated in the figures are summarized in the table below. These dimensions are approximate and provided as a non-limiting example.

|  | W | H | D |
| --- | --- | --- | --- |
| Nacelle of FIG. 15 | 1.15 | 1.6 | 4 |
| Piece of equipment of FIG. 16 | 0.51 | 0.16 | 0.16 |
| Nacelle of FIG. 17 | 1.6 | 2.2 | 6.4 |
| Piece of equipment of FIG. 18 | 0.62 | 0.33 | 0.16 |

On a large size turbine engine, the width of the nacelle is of about 1.6 m, and the width of the pieces of equipment 3 installed is of about 0.62 m, i.e. a ratio of 0.39.

On a small size turbine engine, the width of the nacelle is of about 1.15 m, and the width of the piece of equipment to be installed is of about 0.51 m i.e. a ratio of 0.44.

Thus, for a turbine engine of smaller size, the congestion induced by the pieces of equipment is larger.

Further, turbine engines of smaller sizes generally have reduced hooking-up surfaces.

The invention, as for it, gives the possibility of optimizing the hooking-up of pieces of equipment relatively to the available space.

The invention claimed is:

1. A mounting system for a gas turbine engine comprising:
   a turbine engine casing;
   a piece of equipment; and
   a device for suspending the turbine engine casing from a structure of an aircraft, said device comprising a suspension ring which includes:
   a plurality of attachment surfaces positioned so as to protrude on a circumference of the suspension ring and having attachment holes for attachment to the structure,
   a circumferential flange comprising a plurality of holes for attaching the suspension ring to the turbine engine casing, said circumferential flange extending towards an inside of the suspension ring, the turbine engine casing being attached to the circumferential flange through said plurality of holes; and
   a hanging surface for hanging the piece of equipment, positioned so as to protrude on the circumference of the suspension ring, and having hanging holes for hanging the piece of equipment to the suspension ring, the piece of equipment being attached to the hanging surface through said hanging holes.

2. The mounting system, according to claim 1, wherein the hanging surface includes protruding lugs on the circumference of the suspension ring.

3. The mounting system according to claim 1, wherein the hanging surface comprises two hanging surfaces positioned facing each other on an upstream circumference and on a downstream circumference of the suspension ring.

4. The mounting system according to claim 1, wherein the hanging holes of the hanging surface comprises at least two hanging holes for hanging the piece of equipment.

5. A turbine engine comprising the mounting system according to claim 1.

6. A propulsion assembly comprising:
   the turbine engine according to claim 5;
   wherein the piece of equipment is hung to the suspension ring via a connecting rod attached on the piece of equipment and on at least one of the hanging holes of the hanging surface.

7. The propulsion assembly according to claim 6, wherein the hanging holes of the hanging surface comprises at least two hanging holes, the propulsion assembly comprising the piece of equipment hung to the suspension ring via a connecting rod attached on the piece of equipment and on two of the at least two hanging holes of the hanging surface.

8. The propulsion assembly according to claim 6, wherein: the turbine engine casing comprises a flange adjacent to a flange of another casing of the turbine engine, both flanges comprising a plurality of casing holes,
   the suspension ring, comprising the circumferential flange with the plurality of holes, positioned adjacent to both flanges, which are adjacent to each other, and the circumferential flange of the suspension ring is attached to both of the flanges of the casings, via attachment tools passing through the plurality of casing holes of both of the flanges of the casings and through the plurality of holes of the circumferential flange of the suspension ring.

9. The propulsion assembly according to claim 6, wherein:
   the suspension ring comprising the circumferential flange with the plurality of holes is positioned between flanges of adjacent casings,
   the flanges of the adjacent casings comprising a plurality of casing holes, and the circumferential flange of the suspension ring is attached to the flanges of the adjacent casings, via attachment tools passing through the plurality of casing holes of the flanges of the adjacent casings and through the plurality of holes of the circumferential flange of the suspension ring.

10. The propulsion assembly according to claim 6, further comprising a load spreading connecting rod attached:
    to the piece of equipment hung to the suspension ring, and
    to the turbine engine casing.

11. The mounting system according to claim 1, further comprising a first casing and a second casing adjacent to the first casing, the first casing comprising a first flange, the second casing comprising a second flange, and the circumferential flange being attached to both the first flange and the second flange.

* * * * *